United States Patent
Kjølseth et al.

(10) Patent No.: US 10,981,786 B2
(45) Date of Patent: Apr. 20, 2021

(54) PROCESS FOR PRODUCING COMPRESSED HYDROGEN IN A MEMBRANE REACTOR AND REACTOR THEREFOR

(71) Applicant: COORSTEK MEMBRANE SCIENCES AS, Oslo (NO)

(72) Inventors: Christian Kjølseth, Oslo (NO); Harald Malerød-Fjeld, Oslo (NO); Per Kristian Vestre, Oslo (NO)

(73) Assignee: COORSTEK MEMBRANE SCIENCES AS, Oslo (NO)

( * ) Notice: Subject to any disclaimer, the term of this patent is extended or adjusted under 35 U.S.C. 154(b) by 121 days.

(21) Appl. No.: 16/341,691

(22) PCT Filed: Oct. 16, 2017

(86) PCT No.: PCT/EP2017/076340
§ 371 (c)(1),
(2) Date: Apr. 12, 2019

(87) PCT Pub. No.: WO2018/069546
PCT Pub. Date: Apr. 19, 2018

(65) Prior Publication Data
US 2019/0284048 A1   Sep. 19, 2019

(30) Foreign Application Priority Data
Oct. 14, 2016  (GB) ...................... 1617500

(51) Int. Cl.
*C01B 3/50* (2006.01)
*C01B 32/50* (2017.01)
(Continued)

(52) U.S. Cl.
CPC ............ *C01B 3/503* (2013.01); *B01D 53/326* (2013.01); *B01D 71/024* (2013.01); *B01J 8/009* (2013.01);
(Continued)

(58) Field of Classification Search
CPC ........ C25B 13/04; C01B 3/503; B01D 53/326
See application file for complete search history.

(56) References Cited

U.S. PATENT DOCUMENTS

| | | | |
|---|---|---|---|
| 6,068,673 A | 5/2000 | Bloomfield | |
| 8,845,768 B2 * | 9/2014 | Wachsman | C01B 3/505 48/61 |

(Continued)

FOREIGN PATENT DOCUMENTS

| | | |
|---|---|---|
| DE | 102014214781 | 1/2016 |
| EP | 1048613 | 11/2000 |

(Continued)

OTHER PUBLICATIONS

International Search Report and Written Opinion issued for International Application No. PCT/EP2017/076350, dated Jan. 3, 2018.

(Continued)

*Primary Examiner* — Brian W Cohen
(74) *Attorney, Agent, or Firm* — Meunier Carlin & Curfman LLC

(57) ABSTRACT

A process for direct compression of hydrogen separated from a hydrocarbon source is described herein. The process comprises a first zone wherein a hydrocarbon reaction that produce hydrogen occurs, a ceramic proton conductor which under an applied electric field transport hydrogen from said first zone to said second zone, and a second zone where compressed hydrogen is produced. The heat energy generated by ohmic resistance in the membrane is partially recuperated as chemical energy in the hydrocarbon reforming process to generate hydrogen.

11 Claims, 3 Drawing Sheets

Anode Reaction:
$H_2(g) \rightarrow 2H^+ 2e^-$

Cathodic Reaction:
$2H^+ + 2e^- + \frac{1}{2}O_2(g) \rightarrow H_2O(g)$

(51) Int. Cl.

| | |
|---|---|
| *C01B 32/40* | (2017.01) |
| *B01D 53/32* | (2006.01) |
| *B01D 71/02* | (2006.01) |
| *B01J 19/08* | (2006.01) |
| *B01J 19/24* | (2006.01) |
| *C01B 3/26* | (2006.01) |
| *C01B 3/34* | (2006.01) |
| *B01J 8/00* | (2006.01) |
| *C25B 13/04* | (2021.01) |
| *C25B 11/04* | (2021.01) |

(52) U.S. Cl.
CPC ......... *B01J 19/087* (2013.01); *B01J 19/2475* (2013.01); *B01J 19/2485* (2013.01); *C01B 3/26* (2013.01); *C01B 3/34* (2013.01); *C01B 3/50* (2013.01); *C01B 32/40* (2017.08); *C01B 32/50* (2017.08); *C25B 11/0463* (2013.01); *C25B 13/04* (2013.01); *B01D 2259/812* (2013.01); *B01J 19/248* (2013.01); *B01J 2219/0803* (2013.01); *B01J 2219/0875* (2013.01); *B01J 2219/0892* (2013.01); *C01B 2203/0233* (2013.01); *C01B 2203/0277* (2013.01); *C01B 2203/041* (2013.01); *C01B 2203/047* (2013.01); *C01B 2203/0475* (2013.01); *C01B 2203/085* (2013.01); *C01B 2203/1241* (2013.01)

(56) References Cited

U.S. PATENT DOCUMENTS

| | | | |
|---|---|---|---|
| 2007/0246363 A1* | 10/2007 | Eisman | B01D 53/326 204/520 |
| 2008/0023322 A1 | 1/2008 | Sinuc et al. | |
| 2012/0012471 A1 | 1/2012 | Coelho Tsou et al. | |
| 2016/0036064 A1 | 2/2016 | Tong et al. | |
| 2017/0370010 A1* | 12/2017 | Coors | B01D 53/326 |
| 2019/0006680 A1* | 1/2019 | Mizuhara | H01M 4/86 |

FOREIGN PATENT DOCUMENTS

| | | |
|---|---|---|
| EP | 2246295 | 11/2010 |
| WO | 1999/016140 | 4/1999 |
| WO | 00/14009 | 3/2000 |
| WO | 01/057945 | 8/2001 |
| WO | 01/091218 | 11/2001 |
| WO | 2009/152255 | 12/2009 |
| WO | 2009/157454 | 12/2009 |
| WO | 2012/036057 | 3/2012 |
| WO | 2014/187978 | 11/2014 |

OTHER PUBLICATIONS

Ciria D et al., "Mechanical degradation under hydrogen of yttrium doped barium zirconate electrolyte material prepared with NiO additive", Journal of Power Sources, Elsevier SA, CH, vol. 321, May 7, 2016 (May 7, 2016), pp. 226-232, XP029541761, ISSN: 0378-7753, DOI: 10.1016/J. J P0WS0UR.2016.05.001 p. 227, left-hand column, lines 4-8.

International Search Report and Written Opinion issued for International Application No. PCT/EP2017/076340, dated Dec. 18, 2017.

Coors, et al., "Characterization of composite cermet with 68 wt.% NiO and BaCe0. 2Zr0. 6Y0. 2O3-δ." Journal of membrane science 376.1-2 (2011): 50-55.

* cited by examiner

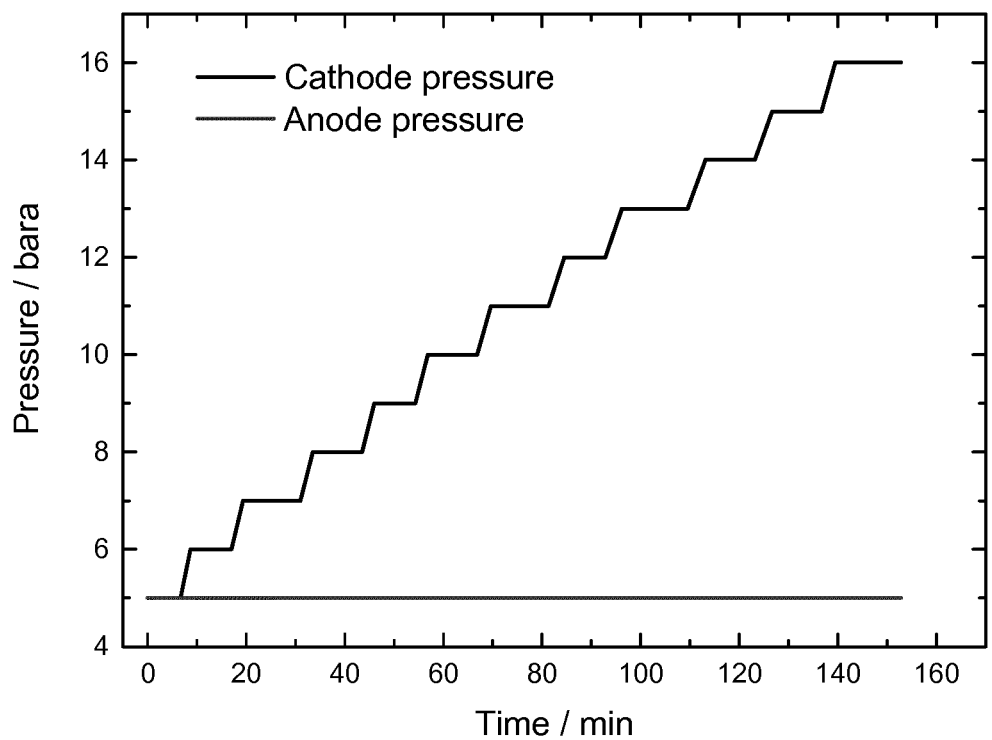
Figure 1 (straight line is anode pressure)
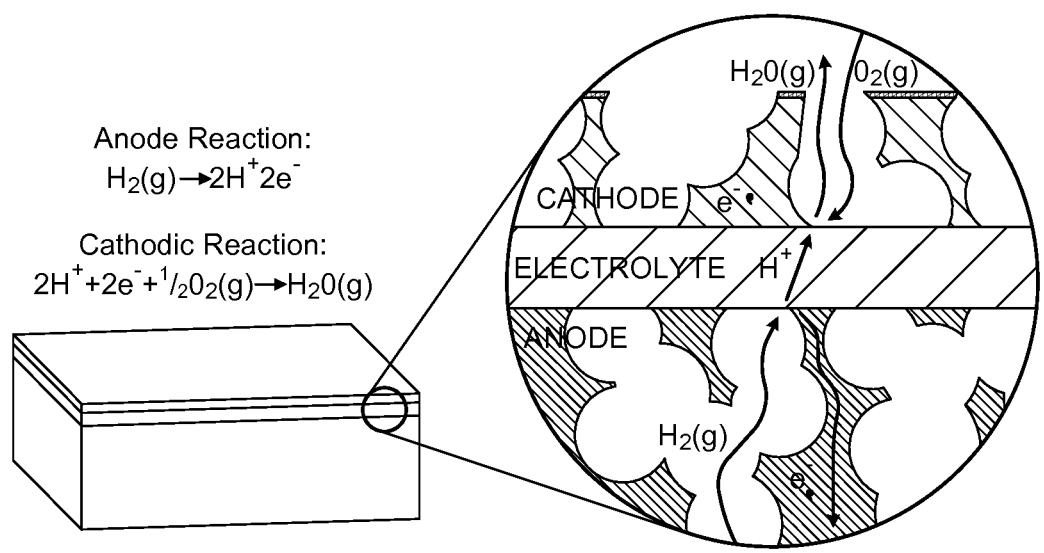
Anode Reaction:
$H_2(g) \rightarrow 2H^+ 2e^-$
Cathodic Reaction:
$2H^+ + 2e^- + \frac{1}{2}O_2(g) \rightarrow H_2O(g)$
Figure 2

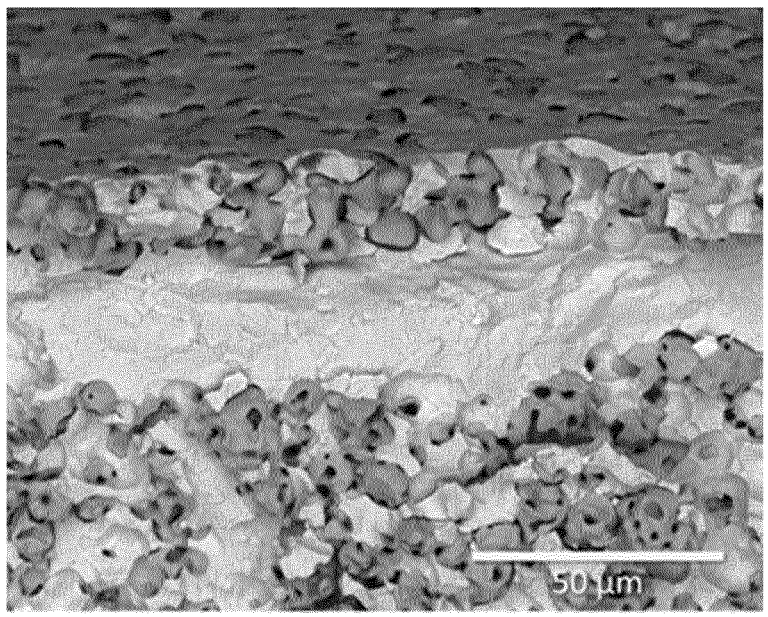
Figure 3
*Figure 4: Planar design illustrating the support (layer 1), the membrane (layer 2) and the electrode (layer 3).*
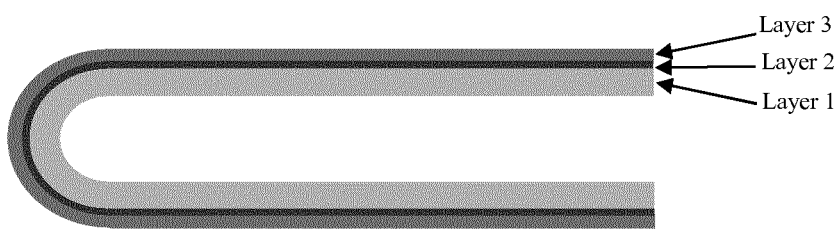
*Figure 5: Tubular design illustrating the support (layer 1), the membrane (layer 2) and the electrode (layer 3).*

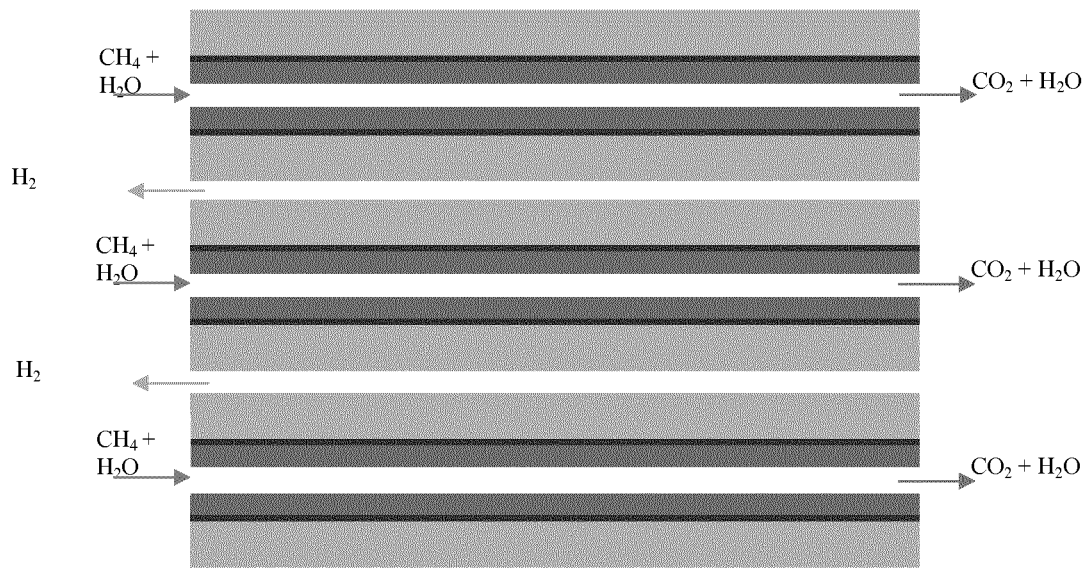
Figure 6: A simple planar reactor design alternative with a counter flow arrangement. The end product is hydrogen and $CO_2$
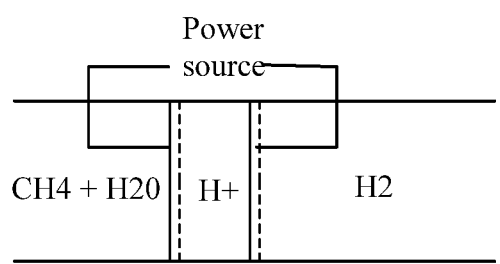
Figure 7

PROCESS FOR PRODUCING COMPRESSED HYDROGEN IN A MEMBRANE REACTOR AND REACTOR THEREFOR

This invention relates to a process for obtaining and compressing hydrogen from a hydrocarbon source. In particular, the invention uses a hydrogen transport membrane to separate hydrogen from its source and create hydrogen pressure on the permeate side of the membrane. An electric field is applied to the membrane to encourage proton transport and Joule heating during the application of the electric field can be used to supply heat for a dehydrogenation process, e.g. steam reforming of methane.

BACKGROUND

Hydrogen can be produced from steam methane reforming (SMR), following the equation:

$$CH_4+H_2O \leftrightarrow 3H_2+CO.$$

The reaction is endothermic ($\Delta H_{298}$=206 kJ mol$^{-1}$), and is commercially operated at high temperatures, >900° C. Downstream the hydrogen concentration is further increased by the shift reaction:

$$CO+H_2O \leftrightarrow H_2+CO_2 (\Delta H_{298}=-41 \text{ kJ mol}^{-1}),$$

before the hydrogen is separated using e.g. pressure swing absorption (PSA). Finally, the hydrogen is compressed using available compressor technologies such as piston or diaphragm mechanical compressors or using electrochemical/chemical compressors.

Alternatively, hydrogen separation can be included in the steam reforming reaction using hydrogen selective membranes. The vast majority of membrane reactors for SMR utilize the metallic hydrogen permselective Pd or Pd in combination with Ag, Cu (Pd-SMR). This enables operation at lower temperatures while still maintaining a high conversion as the hydrogen permeation shifts the steam reforming reaction. The lower temperature and hydrogen extraction facilitates also the shift reaction and allows for further permeation of $H_2$ and a high selectivity of the feed exhaust to $CO_2$.

The drawback for the Pd-SMR is the significant partial pressure difference of $H_2$ needed across the membrane, $pH_2$(retanate)>$pH_2$(permeate). The driving force for hydrogen transport is the chemical potential gradient of hydrogen across the membrane. When the hydrogen partial pressure in the retanate is low, high hydrogen recovery will be challenging.

It follows that the final pressure of hydrogen in the permeate will always be low and further pressurization of hydrogen requires large compressors on a volumetric basis. This is demanding and adds complexity to the overall process and inhibits high energy efficiencies.

Two further challenges are present for the Pd-SMR.
1) Pd-SMR is restricted by temperature. If operated above 500-600° C. failures have been seen due to embrittlement and coke poisoning;
2) External heat management is needed for the endothermic reforming reaction.

Analogous to the Pd-based membranes are mixed ceramic conductors. Example of such a membrane is the LaWO$_{12}$—LaCrO$_3$ based composite described in PCT/EP2014/060708. Although this composite has lower permeability it can be operated at higher temperatures compared to the Pd-SMR; the mechanical and chemical stability is also higher.

For production of synthesis gas, this membrane can produce the heat in-situ if operated with an oxygen containing sweep gas; the permeated hydrogen will react with oxygen and produce steam and heat. By tuning the oxygen content in the sweep gas the SMR process can be operated autothermally. The oxygen containing sweep will also provide the necessary driving force for the permeation. However, by using an oxygen containing sweep, a portion of the permeated hydrogen will be consumed in the reaction with oxygen and thereby decrease the hydrogen recovery. Further, although a counter flow reactor configuration can be used, the hydrogen recovery will be limited by the partial pressure of hydrogen content in the sweep gas.

Two drawbacks using this type of membrane are therefore:
1) Additional separation step of hydrogen from steam is needed and
2) partial pressure of hydrogen cannot exceed that of partial pressure on feed side.

Several chemical processes are thermodynamically limited and/or endothermic and can only be operated at low conversion at low/medium temperatures. Examples of such reactions are:

$$CH_4+H_2O \leftrightarrow 3H_2+CO \qquad (1)$$

$$6CH_4 = C_6H_6+9H_2 \qquad (2)$$

This restricts the system efficiencies, both on a carbon and energy basis. Herein, with hydrogen being a part of the reaction product, the yield of the desired product is thermodynamically limited by the partial pressure of hydrogen in the product mixture.

Similarly, several chemical processes require external heat due to their endothermic nature. Examples of such reactions are:

$$CO+H_2O \leftrightarrow H_2+CO_2 \qquad (3)$$

$$CH_3OH+H_2O \leftrightarrow CO_2+3H_2 \qquad (4)$$

This also restricts the system efficiencies, on energy basis. The endothermic nature of the reactions necessitates the need of external heat being supplied to the system. The production of external heat lowers the total energy efficiency of the system.

It is generally accepted that the hydrogen compressor technology will not be able to meet future infrastructure demands in a cost-effective manner Currently, the hydrogen compressors used today face considerable wear due to the usage of technology with moving parts. Research has shown that for piston pumps the piston sealing ring fails due to non-uniform pressure distribution, and failure of pistons is due to severe impact.

Diaphragm compressors are prone to shorter lifetimes due to contaminations/debris in the $H_2$ gas and improper priming procedures when restarting a compressor after stopping. The operating pressures is high enough to cause local plastic deformation around trapped hard particles leaving residual stresses that reduce the fatigue life of the diaphragm.

The present inventors have appreciated that electrochemical hydrogen compressors will increase the reliability/availability over mechanical compressors as they operate without any moving parts. There remain challenges in designing these electrochemical compressors, such as their energy efficiencies.

This invention solves three separate challenges simultaneously which have hampered the commercial deployment of a range of chemical processes by introducing a galvanic driven protonic membrane compressor. In particular, the protonic membranes of the invention:

1. will remove hydrogen from the reaction chamber and shift a thermodynamically limited process towards higher conversion towards the desired product;
2. will provide heat to an endothermic reaction process; and
3. will simultaneously compress the hydrogen to a desired pressure at the permeate side of the membrane.

Moreover, the high selectivity of the membrane allows only for hydrogen to pass through. The hydrogen produced is therefore of high purity; a final purification stage is therefore not needed.

The combination of these four effects in a single stage results in high energy efficiency. More specifically this yields distinct advantages. The conversion and yield of a chemical process can be increased to a commercial attractive level and the by-product, hydrogen, has an attractive partial pressure and purity for further usage. Finally, the joule heat produced enables operation of the overall process in an autothermal state.

SUMMARY OF INVENTION

Thus viewed from one aspect, the invention provides, a process for compressing hydrogen in a membrane reactor; said membrane reactor comprising a first zone separated by a hydrogen transport membrane from a second zone, said first zone having a gas inlet and a product outlet and said second zone having a product outlet;

said process comprising:
a. feeding a gas comprising a hydrocarbon to said first zone, and allowing a reaction to take place in said first zone so that hydrogen is formed;
b. applying an electric field over said hydrogen transport membrane;
c. allowing hydrogen to disassociate into electrons and protons in said first zone and allowing protons to selectively pass through the hydrogen transport membrane to a said second zone where protons recombine to form of hydrogen in the second zone;

wherein the membrane reactor comprises a pressure regulator at said product outlet from said second zone so that, in operation, the partial pressure of hydrogen in the second zone is higher than the partial pressure of hydrogen in the first zone.

Viewed from another aspect, the invention provides, a process for compressing hydrogen in a membrane reactor; said membrane reactor comprising a first zone separated by a hydrogen transport membrane from a second zone, said first zone having a gas inlet and a product outlet and said second zone having a product outlet;

said process comprising:
a. feeding a gas comprising a hydrocarbon to said first zone, and allowing a reaction to take place in said first zone so that hydrogen is formed;
b. applying an electric field over said hydrogen transport membrane;
c. allowing hydrogen to disassociate into electrons and protons in said first zone and allowing protons to selectively pass through the hydrogen transport membrane to a said second zone where protons recombine to form of hydrogen in the second zone;

wherein the membrane reactor comprises a pressure regulator at said product outlet from said second zone so that, in operation, the partial pressure of hydrogen in the second zone is higher than partial pressure of hydrogen in the first zone; and wherein joule heating which occurs during the application of the electric field over said hydrogen transport membrane is used to heat the first zone.

In a preferred embodiment, the energy required to heat the first zone to the reaction temperature is derived exclusively from joule heating. The gas added to the first zone is ideally hydrocarbon and water.

Viewed from another aspect the invention provides a membrane reactor comprising a first zone separated by a membrane electrode assembly from a second zone, said first zone having a gas inlet and a product outlet and said second zone having a product outlet wherein said product outlet is provided with a pressure regulator;

a power source adapted to pass an electric field over the membrane electrode assembly;

and wherein said membrane electrode assembly comprises, in the following layer order:
(I) a supporting electrode material comprising a Ni composite of formula Ni-$AZr_aCe_bAcc_cO_{3-y}$;
(II) a membrane layer material comprising $AZr_aCe_bAcc_cO_{3-y}$;
(III) a second electrode material comprising a Ni composite of formula Ni-$AZr_aCe_bAcc_cO_{3-y}$, wherein, for each layer independently,
A is Ba, Sr or Ca or a mixture thereof;
the sum of a+b+c equals 1:
b is 0-0.45;
c is 0.1-0.5;
Acc is Y, Yb, Pr, Eu, Pr, Sc or In, or or a mixture thereof; and
y is a number such that formula (I) is uncharged, e.g. y is $2.75 \leq y \leq 2.95$.

Preferably the MEA is
(I) a supporting electrode material comprising a Ni composite of formula Ni—$BaCe_{0.2}Zr_{0.7}Y_{0.1}O_{3-y}$;
(II) a membrane layer material comprising $BaCe_{0.2}Zr_{0.7}Y_{0.1}O_{3-y}$;
(III) a second electrode material comprising a Ni composite of formula Ni—$BaCe_{0.2}Zr_{0.7}Y_{0.1}O_{3-y}$.

DETAILED DESCRIPTION

The present invention concerns a process for dehydrogenating a hydrocarbon reactant such as methane. In particular, the invention uses a hydrogen transport membrane to simultaneously remove hydrogen from a reaction mixture, e.g. in a steam reforming process, and then enable the compression of the removed hydrogen. For hydrogen production through the steam methane reforming reaction, our process solves the problems of separation, compression and heat management in one single step.

The process of the invention takes place in a membrane reactor in which the membrane separates a first zone and a second zone. The first zone may be provided with a catalyst to encourage the dehydrogenation process. The second zone comprises an outlet for the gas that passes through the membrane. The outlet comprises a pressure regulator that enables compression of the hydrogen within the second zone. The reactant is introduced into the first zone and an electric field is applied across the membrane. This encourages the hydrogen that forms to dissociate into protons to pass through the membrane.

The heat generated by the passing of current is used to encourage the endothermic reforming reaction.

Reactant

A gas is added to the membrane reactor in the first step of the process of the invention. The term reactant is used herein to refer to the hydrocarbon gas source which is dehydrogenated in the first zone of the reactor. It is preferred if the reactant for dehydrogenation is a hydrocarbon, especially a saturated hydrocarbon such as an alkane or cycloalkane. Especially preferably the alkane is a $C_{1-4}$ alkane, most especially methane (e.g. natural gas), ethane, propane or butane.

Methane is dehydrogenated according to the equation:

$$2CH_4 \rightarrow C_2H_6 + H_2 \rightarrow C_2H_4 + H_2 \rightarrow C$$

It will be appreciated that the dehydrogenation reaction needs to be stopped before the formation of coke. This is achieved using a combination of factors such as the ideal conductivity of the membrane, and a suitable catalyst. Temperature and pressure can also be used to adjust the equilibrium of the above reaction.

It will also be appreciated that any alkene formed may dimerise or trimerise under the conditions in the reactor to form, for example benzene.

The conversion of reactant achieved in this type of dehydrogenation process is preferably at least 15 wt %, preferably at least 20 wt %, e.g. 25 wt % or more.

Moreover, it is preferred if the selectivity is preferably at least 70 wt %, preferably at least 85 wt %, e.g. close to 100 wt %. This means that the formed dehydrogenated product is at least 95 wt % pure, i.e. there are almost no impurities present at all, except unconverted reactant and hydrogen.

It is more preferred if the gas being dehydrogenated is a mixture of alkanes and water, i.e. as in steam reforming with subsequent water-gas-shift reaction. Methane is reformed according to the following equation:

$$CH_4 + 2H_2O \rightarrow CO_2 + 4H_2$$

When the process of the invention involves such a reforming reaction, lower conversion is acceptable, especially with respect to methane. Conversions of at least 95 wt %, preferably at least 97 wt %, e.g. 99 wt % or more are possible. This means that almost all the substance (typically an alkane) fed to the reactor is converted. The protonic membrane removes hydrogen from the reaction zone and facilitates a near 100% conversion at temperature as low as 800° C.

The overall reforming reaction (steam reforming+water-gas-shift) is endothermic, and conventionally heat can be supplied by heat transfer through the membrane from the exothermic reaction between permeated hydrogen and sweep air. In the present invention, heat is preferably supplied via ohmic losses and hence joule energy as discussed further below. We do not need to react the desired hydrogen with oxygen to generate heat for the reforming reaction. The membrane enables heat management within the system.

Further, compared to using complex metal membranes or unstable perovskites of the prior art, the proton conducting membrane of this invention is stable even in chemically harsh conditions at high temperatures.

It is therefore preferred if the first zone of the membrane reactor contains water (steam) in addition to a hydrocarbon substrate. The reaction products at the outlet of the first zone include CO and/or $CO_2$. These do not pass through the membrane and can be extracted from the first zone.

In a preferred embodiment the feed gas is a mixture of methane and steam in a 1:2 to 1:3 molar ratios. As we note, a current is applied across the membrane in order to encourage transport of hydrogen across the membrane. The heat emitted from the ohmic losses in the membrane operation can be used as reaction heat for the hydrocarbon reforming reaction. So the membrane offers ohmic resistance generating heat. That heat can be converted into chemical energy by heating the hydrocarbon and hence generating hydrogen.

A key aspect here therefore, is that steam reforming is highly endothermic. Note also, that the electrochemical compression of hydrogen will generate heat in itself. It is important therefore that steam reforming is endothermic as the reaction in first zone act as a heat sink for the heat generated ohmically across the membrane and during compression.

Hydrogen is extracted from the retenate side of the membrane using an external bias allowing for direct compression of the hydrogen gas. The process is not dependent on $\Delta pH_2$ across the membrane. Additionally, high hydrogen recovery can be obtained as the removal of hydrogen from the retenate side of the membrane shifts the shift reaction towards $CO_2$.

A membrane electrode assembly of 18.9 $cm^2$ with an area specific resistance (ASR) of 0.8 $\Omega$ $cm^2$ operating at a current density of 328 mA/$cm^2$ will emit 2.7 W. A bundle of 215 tubes will generate 14 kWh during 24 h operation. This heat will balance the heat required to reform 6 $Nm^3$ of $CH_4$ at a conversion of 98%.

Hydrogen Transport Membrane

It is a critical feature of the invention that the reactor is provided with a hydrogen transport membrane which selectively allows hydrogen, in the form of protons, to leave the first zone of the reactor through the membrane but does not allow the starting material hydrocarbon, water or any products to pass through. The membrane may be called a protonic membrane herein. The membrane separates the first reaction zone in which a dehydrogenation process takes place (i.e. in which the feed and, if present, dehydrogenation catalyst come together) from the second zone which will contain hydrogen which passes through the membrane and any means desired to remove that hydrogen.

In one embodiment, the hydrogen transport membrane has some oxygen ion transport properties as well. If the permeate sweep comprises an oxygen containing gas, there will be a gradient to allow oxygen to transport from the permeate side to the reactor chamber (first zone), i.e. across the membrane. A small amount of oxygen in the reactor chamber is favourable to reduce coke formation. Such an oxygen containing material can be water (steam).

The hydrogen transport membrane must be of a material that can selectively transport hydrogen in ionic form as protons. It is preferred if the membrane material is chemically inert and stable at temperatures between 500° C. and 1000° C. in atmospheres containing gases such as alkanes, water, hydrogen and $CO_2$. The membrane material should not promote carbon deposits in the reactor, which typically means that the material should have very low tendency towards carbon uptake, should be of a basic nature and also should have a surface that does not catalytically promote activation of alkanes, in particular methane.

One group of materials that can meet these requirement is some mixed metal oxides, and it is preferred if the membrane material used in the hydrogen transport membrane comprises a mixed metal oxide. Ideally, the transport membrane will possess a proton conductivity of at least $1 \times 10^{-3}$ S/cm. The proton conductivity of the membrane of the invention is preferably at least $1.5 \times 10^{-3}$ S/cm, especially at least $5 \times 10^{-3}$ S/cm. Further, ideally the membrane of the invention should an oxygen transport number of 0.001 to 0.5, such as 0.01 to 0.2, preferably between 0.05 and 0.1.

A range of mixed metal oxides may be suitable, including acceptor doped perovskites (such as Y-doped $BaZrO_3$ and Y—$BaCeO_3$).

Preferred membrane materials therefore include pervoskites according to the general formula (IV)

$$AB_{1-q}B'_qO_{3-z} \qquad (IV)$$

wherein A=La, Ba, Sr or Ca or a mixture thereof; B=Ce, Zr, Ti, In, Tb, Th or Cr or a mixture thereof and B'=Y, Yb, Gd, Pr, Sc, Fe, Eu, In or Sm or a mixture thereof: z is a number sufficient to neutralize the charge; and $0.01 \leq q \leq 0.5$. It will be appreciated that B and B' are different metals.

In one embodiment element B can represent more than one element, such as Zr and Ce.

A preferred formula is therefore $$AZr_{1-p-q}Ce_pB'_qO_{3-z} \qquad (IV)$$

wherein A=La, Ba, Sr or Ca; and B'=Y, Yb, Gd, Pr, Sc, Fe, Eu, In or Sm or a mixture thereof: z is a number sufficient to neutralize the charge; and $0.01 \leq q \leq 0.5$.

In one embodiment element B' is Y.

In one embodiment element B' can represent more than one element, such as Y and Yb.

A preferred formula is therefore $$AB_{1-q}(Y_{1-w}Yb_w)_qO_{3-z}$$

where $0.01 \leq w \leq 0.99$ and other variables are as hereinbefore defined.

An ideal mixed metal oxide comprises the following components:
A, Zr, Acc and O, more preferably ions of
A, Zr, Ce, Acc and O;
wherein A is Ba, Sr or Ca or a mixture thereof; and Acc is a trivalent transition metal or trivalent lanthanide metal such as Y, Yb, Pr, Eu, Pr, In, or Sc or a mixture thereof.

More specifically, a preferred oxide comprises a mixed metal oxide of formula (I)

$$AZr_aCe_bAcc_cO_{3-y} \qquad (I)$$

wherein A is Ba, Sr or Ca or a mixture thereof;
the sum of a+b+c equals 1:
b is 0-0.45;
c is 0.1-0.5;
Acc is a trivalent transition metal or lanthanide metal, such as Y, Yb, Pr, Eu, Pr, In, or Sc or a mixture thereof; and
y is a number such that formula (I) is uncharged, e.g. y is $2.75 \leq y \leq 2.95$.

In particular, it is preferred if A is Ba. It is preferred if Acc is Y or Yb or a mixture thereof, especially Y.

In a further preferred embodiment therefore the membrane comprises a mixed metal oxide of formula (II') or (II")

$$BaZr_aCe_bY_cO_{3-y} \qquad (II')$$

or $$SrZr_aCe_bY_cO_{3-y} \qquad (II'')$$

wherein the sum of a+b+c equals 1:
b is 0-0.45;
c is 0.1-0.5; and
y is a number such that formula (I) is uncharged, e.g. y is $2.75 \leq y \leq 2.95$.

Where b is 0 there are no Ce ions and the formula reduces to:

$$BaZr_aY_cO_{3-y} \qquad (III')$$

or $$SrZr_aY_cO_{3-y} \qquad (III'')$$

wherein the sum of a+c equals 1:
c is 0.1-0.5; and
y is a number such that formula (I) is uncharged, e.g. y is $2.75 \leq y \leq 2.95$.

A preferred ceramic comprises ions of Ba, Ce, Zr, Y and O. A highly preferred ceramic mixed metal oxide is of formula $BaZr_{0.7}Ce_{0.2}Y_{0.1}O_{3-y}$.

It is preferred if b+c sums to 0.1 to 0.5, such as 0.2 to 0.4.

It is preferred if b is 0.1 to 0.4, such as 0.15 to 0.3, e.g. 0.2.

It is preferred if c is 0.05 to 0.2.

It is preferred if the ceramic material of the membrane adopts a perovskite crystal structure.

The metal ions required to form the ceramic mixed metal oxide that forms the membrane layer can be supplied as any convenient salt of the ion in question. In order to form the membrane, a sintering process is required. During the sintering process, the salts are converted to the oxide so any salt can be used. The amount of each component is carefully controlled depending on the target end mixed metal oxide.

Suitable salts include sulphates, nitrates, carbonates and oxides of the ions. The use of sulphates is preferred for the alkaline earth metal component, especially $BaSO_4$. The use of $CeO_2$ is preferred for the cerium ion source. The use of $ZrO_2$ is preferred as the Zr source. The use of oxides is preferred for the Acc ion source. $Y_2O_3$ is preferred as the Y ion source.

Particles of the reactant precursor materials can be milled to form a powder mixture.

The membrane layer may have a thickness of 1 to 500 micrometers, such as 10 to 150 micrometres. Membranes having thickness in the lower end of the range will require a structural support, while membranes with thickness in the higher end of the indicated thickness range may be "self-supported".

It is preferred if the reactants needed to make the membrane layer are prepared as a slurry in an aqueous or non aqueous solvent (such as an alcohol). The use of water is preferred. The relative amounts of the reactants can be carefully measured to ensure the desired mixed metal oxide stoichiometry. Essentially all the metal oxide present becomes part of the sintered membrane body and all other components are removed thus the amounts of each component required to develop the desired stoichiometry can be readily calculated by the skilled person.

As well as the metal salts required to make the mixed metal oxide, the slurry used to make the membrane may comprise other components present to ensure the formation of membrane. Such components are well known in the art and include binders, rheology modifiers, dispersants and/or emulsifiers or other additives to ensure that the support forms and remains solid and intact until the sintering process. Additives therefore act as a kind of adhesive sticking the metal salt particles together to form a layer.

Suitable additive compounds include ammonium polyacrylate dispersant and acrylic emulsions. The content of additive such as emulsifier/dispersant may be between 0 to 10 wt %, such as 1 to 5 wt % of the mixture as a whole. Suitable binders would be methyl cellulose, acrylic emulsions, and starches. The content of such binders may be between 0 to 10 wt % such as 1 to 5 wt % of the mixture as a whole.

Water is the preferred solvent and may form 5 to 20 wt % of the slurry used to form the membrane. The metal components required to form the composite may form 50 to 80 wt % of the slurry.

This slurry can be extruded, applied to a mould etc to form the membrane and subsequently dried to leave a solid but unsintered green body as a precursor to the membrane layer. It will be appreciated that any additives present are preferably organic as these will decompose during the sintering process. It will be appreciated that the green layers described herein are precursors of the actual membrane. The membrane is formed upon sintering, described in detail below.

During operation of the transport membrane an electric field is applied to the membrane. It will be appreciated that electrodes may be added to operate the membrane. Preferred electrodes, which are exposed to the first zone of the reactor, should have following characteristics:

Electronic percolation

Catalytic activity towards hydrogen dissociation

Porous microstructure to allow gas diffusion of $H_2$ to and from triple phase boundaries and avoid concentration polarization due to accumulation of larger hydrocarbon molecules or steam Chemical compatibility with catalyst, if applied, under reactor operation The electrode can be a single phase or composite with multiple phases. Some potential candidate materials include the following groups:

Metals/metal alloys (such as Ni, Fe, Pt and Pd alloys)

Mixed metal oxides such as $La_{1-x}Sr_xCr_{1-y}Mn_yO_3$

It is preferred if the electrode has catalytic properties for the steam methane reforming reaction. Such materials are:

Ni

Fe

The second electrode not exposed to the first zone in the membrane reactor may be selected from a wider range of materials known to those skilled in the art.

In a preferred embodiment, the electrodes required form part of a membrane electrode assembly (MEA) comprising two electrode layers and a membrane layer (or electrolyte layer).

The electrodes in this embodiment may be of the same composition, especially using a material that both exhibits activity for steam reforming and hydrogen disassociation/association. Such a material may be Ni. This embodiment is described in more detail below.

The hydrogen transport membrane assemblies can be fabricated with such techniques generally known to those skilled in the art of fuel cells and inorganic gas separation membranes.

Support

It may be necessary to use a support to carry the membrane or catalyst described in more detail below. In some embodiments, the membrane of the invention is self-supporting however, it is within the scope of the invention to use a support. The support should be inert, porous and capable of withstanding the conditions within the reactor. In one embodiment, the support also forms an electrode.

The following are important properties for the support:

Porous

Chemically compatible with the membrane—does not react to form a secondary insulating phase;

Mechanically compatible with the membrane—thermal expansion coefficient should preferably match that of the membrane.

In one embodiment, the support will be an inert metal oxide such as an alkali metal oxide or silica or alumina. Such supports are well known in this field. In general, the particle size in the support should be greater than the particle size in the membrane, e.g. at least 200 nm higher. Supports may be 2-300 μm to 1 mm or more in thickness.

The design of the support material depends on the design of the whole reactor. Typically the membrane, and hence any support, will be planar or tubular. The term tubular may be used herein to designate a membrane that is a hollow cylinder with two open ends, or alternatively it may be a plurality of smaller channels forming a "honeycomb structure" or it can take the shape of a "test tube", i.e. a cylinder with hemispherical end portion but open at the other end.

In a tubular embodiment, porous support tubes can be extruded. Both thermoplastic and water based extrusion processes can be used. The support is then heat treated to yield the desired mechanical strength. In a planar embodiment the support material can be tape cast, also followed by heat treatment to yield the desired mechanical strength. In a tape casting process, a slurry of the material is typically spread evenly onto a flat horizontal surface by means of a doctor blade. After drying, the thin, film formed can be removed, cut to the desired shape and fired.

To manufacture a support structure either as a planar support or as a tube, an ink of the desired support material can be produced either using water as a solvent or an organic solvent, optionally as well as stabilizing agents. To have controlled porosity, a pore filler material is often used, e.g. carbon black. The ink can then be tape cast or extruded. The support is subsequently fired to a desired firing temperature, such as 600 to 1500° C. to yield mechanical robust supports with a desired porosity.

In a complex design embodiment, the porous support tubes can be prepared by gel casting. A mould is prepared of the desired structure. A solution of the desired material is then prepared and poured into the mould. After the solution is gelified the mould is removed. The support is subsequently fired to a desired firing temperature, such as 600 to 1500° C. to burn out the organic residue and to yield mechanically robust supports with a desired porosity.

In the simplest embodiment, the membrane is self supported. In one embodiment however, the invention is multilayered and is formed from a layer of the hydrogen transport material, and two layers which act as electrodes. One or both also act as support layers.

In this regard, a supported membrane can be called a membrane electrode assembly (MEA) and comprises an anode/electrolyte/cathode configuration in which one electrode layer acts as a structural element to support mechanical loads. The electrode layers are porous and the electrolyte layer is dense (non porous). The dense layer is the hydrogen transport membrane as hereinbefore defined. The MEA therefore has the structure: first electrode: membrane; second electrode.

First Electrode

The first electrode layer tends to be thicker than the electrolyte or second electrode layer as it supports the MEA. It is therefore preferred if the MEA does not contain a separate support layer. The MEA should be supported by the first electrode layer.

The first electrode layer may have a thickness of 250 microns to 2.0 mm, such as 500 microns to 1.5 mm, preferably 500 microns to 1.2 mm.

The first electrode layer is preferably produced in the green state, i.e. it is not sintered/densified before the application of the electrolyte layer thereto.

The MEA may be in cylindrical form or planar form (or any other layered structure as required). Ideally however, the MEA is planar or cylindrical, especially cylindrical. Either anode or cathode can be present at the centre of the cylinder and the first electrode layer can be either anode or cathode.

The method for the preparation of the first electrode layer is quite flexible. In order to prepare the first electrode layer, a mould or support may be used. Thus, the first electrode layer may be deposited on a cylindrical or planar supporting mould. After the layer is formed, the mould can be removed leaving the first electrode layer. Alternatively, the first electrode layer could be extruded to form a cylinder or planar support.

The first electrode layer may be prepared by methods including extrusion, slip casting, injection molding, tape casting, wet and dry bag isopressing, and additive manufacturing.

The length/width of the first electrode layer is not critical but may be 10 to 50 cm. In tubular form, the inner tube diameter may be 2.0 mm to 50 mm, such as 2.0 to 15.0 mm. By inner tube diameter means the diameter is measured from the inside of the layer and excludes the thickness of the actual tube.

The mixture used to manufacture the supporting electrode material comprises ceramic powders and optional additives such as emulsifiers, pore formers, binders, rheology modifiers etc. in order to allow the formation process. The first electrode is preferably produced from a slurry comprising ceramic components, binders and rheology modifiers.

After sintering, the first electrode will comprise a mixed metal oxide so the mixture used to prepare it should comprise precursors to the desired mixed metal oxide. A preferred mixed metal oxide is based on the combination of an alkaline earth metal such as Ba or Sr with Zr and a lanthanide such as Y. The use of Ba, Zr and Y is preferred (forming therefore a BZY type mixed metal oxide). In a preferred embodiment therefore, the support electrode, after sintering is a BZY type material. The mixed metal oxide may also preferably contain Ce ions.

Ideally, the first electrode comprises ions of
A, Zr, Acc and O, more preferably ions of
A, Zr, Ce, Acc and O;
wherein A is Ba, Sr or Ca or a mixture thereof; and Acc is a trivalent transition metal or trivalent lanthanide metal such as Y, Yb, Pr, Eu, Pr, In, or Sc or a mixture thereof.

More specifically, a preferred final (i.e. sintered) first electrode layer comprises a mixed metal oxide of formula (I)

$$AZr_aCe_bAcc_cO_{3-y} \qquad (I)$$

wherein A is Ba, Sr or Ca;
the sum of a+b+c equals 1:
b is 0-0.45;
c is 0.1-0.5;
Acc is a trivalent transition metal or lanthanide metal such as Y, Yb, Pr, Eu, Pr, Sc or In, or a mixture thereof; and
y is a number such that formula (I) is uncharged, e.g. y is 2.75≤y≤2.95.

In particular, it is preferred if A is Ba. It is preferred if Acc is Y or Yb or a mixture thereof, especially Y.

In a further preferred embodiment therefore the first electrode comprises a mixed metal oxide of formula (II)

$$BaZr_aCe_bY_cO_{3-y} \qquad (II')$$

or $$SrZr_aCe_bY_cO_{3-y} \qquad (II'')$$

wherein the sum of a+b+c equals 1:
b is 0-0.45;
c is 0.1-0.5; and
y is a number such that formula (I) is uncharged, e.g. y is 2.75≤y≤2.95.

Where b is 0 there are no Ce ions and the formula reduces to:

$$BaZr_aY_cO_{3-y} \qquad (III')$$

or $$SrZr_aY_cO_{3-y} \qquad (III'')$$

wherein the sum of a+b+c equals 1:
c is 0.1-0.5; and
y is a number such that formula (I) is uncharged, e.g. y is 2.75≤y≤2.95.

A preferred ceramic comprises ions of Ba, Ce, Zr, Y and O. A highly preferred ceramic mixed metal oxide is of formula $BaCe_{0.2}Zr_{0.7}Y_{0.1}O_{3-y}$.

It is preferred if b+c sums to 0.1 to 0.5, such as 0.2 to 0.4.
It is preferred if b is 0.1 to 0.4, such as 0.15 to 0.3, e.g. 0.2.
It is preferred if c is 0.05 to 0.2.
It is preferred if the ceramic material of the first electrode adopts a perovskite crystal structure.

The first electrode material is a composite material in which the ceramic mixed metal oxide, ideally the BZY mixed metal oxide described above, is combined with NiO. On sintering and after passing a reducing gas to reduce NiO to Ni at a temperature between 500 and 1000° C. this creates a porous structure through which the likes of hydrogen can pass. In a preferred embodiment therefore, the first electrode material, is a mixture of BZY metal oxide with a nickel oxide. On sintering, it produces a composite of nickel oxide with the BZY. After sintering, the composite can be exposed to a reducing gas, which reduces the nickel oxide to nickel leaving a porous structure.

The compounds required to make the target mixed metal oxide of the first electrode can therefore be combined with a nickel compound to form a composite structure. The Ni is preferably added in the form of its oxide.

The ratio of Ni compound:mixed metal oxide in the composite after sintering may be 0.2 to 0.8 on a volumetric basis. Ideally, the nickel compound(s) forms at least 50 wt % of the green electrode layer. Ideally, the Ni component forms at least 50 wt % of the sintered electrode.

The metal ions required to form the ceramic mixed metal oxide that forms the electrode layer can be supplied as any convenient salt of the ion in question. During the sintering process, the salts are converted to the oxide so any salt can be used. The amount of each component is carefully controlled depending on the target end mixed metal oxide. The Ni oxide acts as a sintering aid. The amount of Ni material added can also be readily calculated by the skilled person.

Suitable salts include sulphates, nitrates, carbonates and oxides of the ions. The use of sulphates is preferred for the alkaline earth metal component, especially $BaSO_4$. The use of $CeO_2$ is preferred for the cerium ion source. The use of $ZrO_2$ is preferred as the Zr source. The use of oxides is preferred for the Acc ion source. $Y_2O_3$ is preferred as the Y ion source.

Particles of the reactant precursor materials can be milled to form a powder mixture. Once formed, this powder mixture can be combined with nickel oxide to form a powder mix.

It is preferred if the reactants and the Ni oxide needed to make the first electrode layer are prepared as a slurry in an aqueous or non aqueous solvent (such as an alcohol). The use of water is preferred. The relative amounts of the reactants can be carefully measured to ensure the desired mixed metal oxide stoichiometry and the desired Ni content in the final product after sintering. Essentially all the metal oxide/NiO present becomes part of the sintered electrode body and all other components are removed thus the amounts of each component required to develop the desired stoichiometry can be readily calculated by the skilled person.

As well as the metal salts required to make the mixed metal oxide and the nickel oxide composite, the slurry used to make the first electrode layer may comprise other components present to ensure the formation of an electrode layer. Such components are well known in the art and include binders, rheology modifiers, dispersants and/or emulsifiers or other additives to ensure that the electrode support forms and remains solid and intact until the sintering process. Additives therefore act as a kind of adhesive sticking the metal salt particles together to form a layer.

Suitable additive compounds include ammonium polyacrylate dispersant and acrylic emulsions. The content of additive such as emulsifier/dispersant may be between 0 to 10 wt %, such as 1 to 5 wt % of the mixture as a whole. Suitable binders would be methyl cellulose, acrylic emulsions, and starches. The content of such binders may be between 0 to 10 wt % such as 1 to 5 wt % of the mixture as a whole.

Water is the preferred solvent and may form 5 to 20 wt % of the slurry used to form the supporting electrode layer. The metal components required to form the composite may form 50 to 80 wt % of the slurry.

This slurry can be extruded, applied to a mould etc as discussed above to form the first electrode and subsequently dried to leave a solid but unsintered green body as a precursor to the composite first electrode layer. It will be appreciated that any additives present are preferably organic as these will decompose during the sintering process. It will be appreciated that the green layers described herein are precursors of the actual electrode. The electrode is formed upon sintering.

Second Electrode

The second electrode typically has a similar structure to that of the first electrode. It is ideally therefore a composite of a mixed metal oxide and Ni oxide. Any method can be used to apply the second electrode layer to the electrolyte layer. It will be appreciated that these two layers should be adjacent without any intermediate layer. Methods include dip coating, spray coating, hand wash, pulsed laser deposition, physical vapor deposition, and screen printing.

The second electrode layer may have a thickness of 20 to 400 microns, such as 30 to 100 microns.

It will be appreciated that the second electrode layer need not cover the whole of the electrolyte layer. The dimensions of the second electrode layer can be controlled by the person skilled in the art.

The second electrode layer is preferably provided as a green ceramic slurry. For the second electrode slurry, the weight fraction of metallic powders to spray vehicle is preferably between 30 and 85% by weight, preferably from 40 to 76%. The solvent for the second electrode slurry may be organic or aqueous but is preferably aqueous so as to minimize re-dissolution of the electrolyte layer and/or swelling of the electrolyte layer both of which would lead to catastrophic failure of the membrane prior to further processing.

Again, the ceramic compounds used to form the second electrode layer are ideally mixed with additives including emulsifiers, rheology modifiers, binders and so on to ensure a good layer application to the electrolyte layer. The viscosity of the slurry is controlled to aid deposition. The viscosity required is a function of the nature of the application technique. For spray coating, slurries may have a viscosity of 10 to 30 cP as measured using a LV2 spindle at 60 rpm on a Brookfield viscometer. Being an aqueous system, the viscosity can be easily adjusted by the use of polyionic dispersing agents. Such dispersants can be polyacrylate and polymethacrylate salts and lignosulfonates, with ammonium polyacrylate (e.g., Duramax D-3005 or Darvan 821A) being preferable. A dip coating slurry can be prepared containing approximately a) 50 wt % of a mixture comprising 75 to 95 wt % electrode powders, 2 to 3% methylcellulose binder, up to 2% starch, up to 2% plasticizer, up to 2% dispersant; and b) 50 wt % water.

It is preferred if the second electrode, after sintering, is a composite of formula Ni-$AZr_aCe_bAcc_cO_{3-y}$ A where the ratio of Ni-$AZr_aCe_bAcc_cO_{3-y}$ is 0.2 to 0.8 on a volumetric basis and the variables are as herein before defined for first electrode layer.

Alternatively viewed, it is preferred if the second electrode, after sintering, is a composite of formula Ni-$AZr_aCe_b$ $Acc_cO_{3-y}$, where the weight ratio of Ni:$AZr_aCe_bAcc_cO_{3-y}$ is 0.2 to 0.8 and the variables are as herein before defined for first electrode layer.

The porosity of the Ni-cermet can be achieved with a similar manner as the $1^{st}$ electrode. The porosity is achieved by reducing NiO to Ni under reducing conditions at 500-1000° C.

In one embodiment the solvent used to deposit the outer electrode is different from the solvent used to deposit the membrane layer. This is important as we don't want the subsequent electrode deposition step to dissolve any of the binders used in the membrane formation step.

For example, if the binder used in the membrane coating is soluble in water, the layer will dissolve in water if we dip coat the outer electrode using an aqueous solvent. The binders used in the adjacent layers can therefore be chosen to dissolve in different solvents, e.g. polar and non polar solvents.

Even when dissolution is not an issue, the membrane layer can absorb a solvent and swell. So, even if the green membrane layer does not dissolve, it could swell, causing cracking and delamination.

In a preferred embodiment, water is employed as the solvent for outer electrode deposition and an ester as the solvent for the spray coating of the membrane. Additives can be added to the slurries used in the coating process to adjust the solubility of the membrane layer/electrode layer in organic/aqueous solvents.

Sintering

Once the three layers are formed, the whole assembly can be sintered. In the sintering process, the whole assembly is subject to thermal heat treatment to firstly remove organic components and any water and secondly to densify the assembly. It may be that the heat treatment process is effected in stages.

A lower initial heat treatment step can be used to remove organics that are present. That step can be followed by a higher temperature sintering step to complete the densification process.

The initial heat treatment sinter may be effected at a temperature of 200 to 500° C., such as 250 to 400° C. The process will start at ambient temperature and the rate of temperature increase may be 1 to 5° C. per minute. The sinter may dwell at a temperature in the above range for a period of time.

The sintering temperature to ensure densification of the MEA may be effected at a temperature of at least 1000° C., such as 1100 to 2000° C., e.g. 1200 to 1900° C. Ideally, temperatures up to 1800° C., e.g. 800 to 1700° C., preferably 1000 to 1650° C., e.g. 1200° C. to 1600° C. are used. Again, the rate of temperature increase may be 1 to 5° C. per minute.

Sintering can be done in several different atmospheres, e.g. oxygen, hydrogen, inert gasses such as hydrogen, steam or mixtures such as air or humidified oxygen. Ideally an atmosphere such as air is used. If NiO is present during sintering of a membrane supported on a NiO-cermet and sintering is done under an atmosphere where the NiO is retained in the material, a second reducing step is needed. It is advised that this step is done under reducing conditions such as hydrogen or diluted hydrogen. It is further advised that this is done at a temperature a temperature between 500 and 1200° C., more preferred between 700 and 1100° C., most preferred between 800 and 1000° C. After sintering, it is preferred if each layer of the MEA is essentially free of any organic material. Electrode layers ideally consist of the composite of Ni-BZY and the membrane layer consists of a BZY material. The mixed metal oxide of the hydrogen transport membrane is ideally a ceramic.

The electrode layers are ideally porous, letting compounds such as hydrogen penetrate without hindrance. The electrolyte layer is ideally dense.

Alternatively, the membrane can be formed simply from the mixed metal oxide and optional support with the dehydrogenation catalyst forming, for example, a matrix within the reactor which the feed passes through. The catalyst may be provided therefore as a particulate bed.

In any process of the invention, sintering can be carried out at the temperatures above.

Several thin film techniques can be used to deposit membranes on supports. These include, for example:
  Screen printing;
  Chemical vapour deposition techniques (CVD);
  Spray deposition methods—e.g. ultrasonic spray deposition (USD);
  Electrophoretic deposition;
  Spin and dip coating;
  Slurry coating; and
  Impregnation.

Screen printing, spray deposition and spin/dip coating are preferred techniques. Screen printing is easy to upscale and can readily achieve thicknesses down to 10 μm.

The membrane will preferably be formed as a planar membrane or tubular membrane, especially a tubular membrane.

In a planar embodiment the membrane is preferably deposited on a porous support using a screen printing technique.

Reactor Process Conditions

The process of the invention requires that the starting material is fed in the reactor. The temperature of the feed is such that the materials are fed as gases but typically, the feed will be heated to have the same temperature as the reactor.

The process within the reactor is normally operated at high temperatures of 300° C. to 1000° C., preferably 400° C. to 800° C. The pressure within the reactor may range from 0.5 to 50 bar, preferably 5 bar to 25 bar.

There needs to be a flow from the feed inlet to the product outlet within the reactor. Feedstock gas flow, measured as GHSV (gas hourly space velocity) is normally in the range 500-30,000 mL/gh, more preferred in the range 1000-10,000 mL/gh.

Hydrogen is generated during the dehydrogenation reaction and the amount of hydrogen removed from the reactor via the transport membrane can be manipulated depending on how the user wants the process to be run.

The electrochemical driving force for the hydrogen transport across the hydrogen membrane is the result of an external voltage being applied to the membrane.

Thus, the membrane is provided with an electrode in order to allow an electric field to be applied over the membrane. This allows hydrogen to disassociate into electrons and protons whereupon protons selectively pass through the hydrogen transport membrane to a said second zone where proton recombine with electrons that are provided through the external circuit resulting in formation of hydrogen on the second side of the membrane.

As hydrogen passes through the membrane, the pressure in the second zone increases. Once the process has started therefore, the partial pressure of hydrogen in the second zone is higher than the partial pressure of hydrogen in the first zone. In particular, the pressure in the second zone is at least 2×, such as at least 5× such as at least 15× the pressure in the first zone. Pressures up to 20× or less are possible. The partial pressure of hydrogen in the first zone may be 1-70 bar, or more preferred 5-30 bar or most preferred 10-20 bar.

The reactor is provided with a pressure regulator at the gas outlet within the second zone. This pressure regulator enables control over the pressure with the second zone by preventing hydrogen that has passed across the membrane from escaping the second zone. Once the process is running, the pressure of hydrogen in the second zone is higher than the pressure of hydrogen in the first zone and can be controlled via the pressure regulator. This is clearly illustrated in FIG. 1.

The pressure regulator can be used to ensure a particular pressure is achieved within the second zone. Suitable pressures within the second zone are 2 to 700 bars, such as 10 to 350 bars, e.g. 20 to 100 bars.

Joule heating, also known as ohmic heating or resistive heating, is the process by which the passage of an electric current through a conductor releases heat. In the present invention, the ohmic loss during the operation of the membrane will cause Joule heating. The heat generated in this process can be used to provide the heat required for the reforming process.

A membrane electrode assembly of 18.9 cm$^2$ with a area specific resistance (ASR) of 0.8 Ω cm$^2$ operating at a current density of 328 mA/cm$^2$ will emit 2.7 W. A bundle of 215 tubes will generate 14 kWh during 24 h operation. This heat will balance the heat required to steam reform 6 Nm$^3$ of CH$_4$ at a conversion of 98%.

Thus the current applied across the membrane can be readily determined depending on the resistance of the membrane.

The membrane may have a resistance of 0.2 to 1.5 of 0.8 Ω cm$^2$ such as 0.5 to 1.2 of 0.8 Ω cm$^2$. The current density applied can be 200 to 600 mA/cm$^2$, such as 250 to 500 mA/cm$^2$.

Dehydrogenation Catalyst

The reactor used in the present process may employ a dehydrogenation catalyst to encourage the dehydrogenation reaction. Any dehydrogenation catalyst capable of achieving the desired process can be used.

The dehydrogenation catalyst may be integrated in the catalytic membrane reactor as a packed fixed bed, as a fluidized bed, by deposition on the membrane wall, by being a part of or the same as an electrode, or in other way.

The dehydrogenation catalyst is preferably a porous catalyst but it should ideally have some electron and proton conductivity as these species may need to be transported through the catalyst on the membrane.

For methane dehydrogenation, the one suitable catalyst is a H-ZSM5 or MCM-22 zeolite with an active metal with reported activity in the order Mo>W>Ga>Fe>V>Cr to form aromatic products.

Some perovskite compounds may be suitable as catalysts such as those of formula $AB_{1-q}B'_qO_{3-z}$ where A=Ca, Sr or Ba; B=Ce, Tb, or Pr; B'=Ti, V, Cr, Mn, Fe, Co, Ni, or Cu or combinations thereof; and $0.02<q<0.5$.

Preferably, however the most suitable catalysts include metals of the first row of transition metals such as Ni, Fe, Pt, Ag, Pd and their alloys. These can be supported on alkali metal oxides with suitable examples $CrO_2$, $MoO_3$ and $V_2O_5$. or be a part of the electrode.

For ethane dehydrogenation any of the above mentioned catalysts for methane is applicable, but preferred catalysts include alumina supported $Ga_2O_3$, $CrO_2$, $MoO_3$ and $V_2O_5$ such as $CrO_2$, $MoO_3$ and $V_2O_5$.

The choice of metal depends on the design, the desired activity and the compatibility with the membrane reactor.

In one embodiment the catalyst is a part of the electrode. The catalyst material functions both as the electronic conductor for the electrode and as a catalyst for the dehydrogenation reaction. The deposition will be as that described for electrode fabrication.

In one embodiment the catalyst will be deposited on the membrane. This will be achieved by techniques such as dip coating or impregnation, where the catalyst is dispersed in a solution. The membrane is then heat treated so that the catalyst is adhered to the membrane surface. The deposition can also be achieved by growing the catalyst directly on the membrane by a crystal growth technique.

A second embodiment includes a reactor where the catalyst is freely lying on top of, or in front of the membrane. The catalyst can be in the form of powder with tailored particle size. The catalyst is not adhered to the membrane. In this embodiment the catalyst can therefore easily be exchanged if it needs to be regenerated.

In some embodiments, no catalyst is used at all. In some embodiments, the material used in the membrane has sufficient catalytic activity that no further catalyst is needed.

Catalytic Membrane Reactor

In principle any reactor design can be used, however preferred reactor designs are flow-type fixed bed, fluidized bed and wash-coated designs. It is important therefore that there is flow from inlet to outlet in the first zone of the reactor. One advantageous design utilises a reactor within which there is a tubular transport membrane. Between the reactor walls and the tubular membrane is an optional bed of dehydrogenation catalyst. This forms the first zone in the reactor. This bed need not extend the whole length of the reactor but it may. Alternatively, the first zone of the reactor is inside the tube where the catalyst is preferably located.

For a steam reforming reaction, water and alkane gases are fed into the first zone. Optionally the gases are fed into the inside of the tube, if that is preferred. Dehydrogenation occurs on contact between the reactants and any catalyst thus forming hydrogen. Hydrogen gas generated passes through the membrane and into the second zone of the membrane which is dependent on where the catalytic reaction occurs.

Current can also be applied as explained above to encourage transport of hydrogen across the membrane.

Gases which pass through the catalyst bed and which do not pass through the membrane can be collected at the outlet in the first zone.

It is preferred that the distance from the catalyst to the membrane is as short as possible, preferable no more than 5 cm and more preferable less than 5 mm.

It is most preferred that the catalyst is a part of the electrode or the electrode material of electrode in first zone.

It is preferred if hydrogen is removed in a counterflow direction to the flow of the reactant gases.

The invention will now be defined with reference to the following non limiting examples and figures.

BRIEF DESCRIPTION OF THE FIGURES

FIG. 1 shows the increasing pressure within the membrane reactor during steam reforming.

FIG. 2 is a general schematic of a membrane electrode assembly (MEA) showing an anode at which reactions occur that generate electrons, a cathode at which reactions occur that consume electrons, and an electrolyte which conducts ions but is insulating towards electrons. In this case, the overall reaction is the oxidation of hydrogen to generate water.

FIG. 3 is a micrograph of a fracture surface showing the structure resulting from the use of a single co-sintering step to produce the MEA architecture. Note that the electronically active component of the electrodes (dark grey phase) has undergone a further reduction step.

An electrode support structure is illustrated in FIG. 4. The first layer comprises the electrode support. The second layer comprises the membrane. The third layer comprises the second electrode. In a further embodiment, a catalyst layer can be adhered to the surface of the MEA or lie freely on top (not shown).

A tubular membrane-support structure/design is illustrated in FIG. 5. Two general designs are possible. One with a catalyst layer on the surface of electrode layer 3 and one with the catalyst layer on the inside of the tube. An arrangement with the catalyst layer on the surface of the tube is advantageous if the dehydrogenation reaction is slow. If the reduction reaction of $O_2$ and/or the water formation reaction and/or the diffusion of water/$O_2$ to the membrane are the slowest the arrangement with the catalyst layer inside the tube will be advantageous.

FIG. 5 shows the support layer (1) with membrane layer (2) and outer electrode layer 3.

An embodiment for a planar reactor design is illustrated in FIG. 6. Modules of catalyst-membrane-support assemblies are stacked horizontally arranged so that the support faces a support of a second assembly, and the catalyst faces a catalyst of a third assembly and so on. This stacking form channels for the reactant gas and the purge gas respectively. Each assembly is sealed at the end with suitable sealing material, such as a glass which is non-catalytically active towards coke formation. The embodiment shown has a counter-current gas flow. This configuration has a similar hydrogen pressure gradient AP in the two end segments. The first segment is located at the inlet of the reactant gas. The hydrogen concentration will be highest at this point, while the oxygen content in the purge gas will be the lowest. In the other end, of the air inlet, the hydrogen pressure will be at the lowest point, while the oxygen pressure will be at the highest. The pressure gradient in the two ends will be approximately equal, which is also true for the part between the two ends. This will ensure a homogeneous dehydrogenation along the membrane, which furthermore will stabilize the conversion towards carbon formation. In this way a constant thickness of the membrane can be used throughout the reactor.

FIG. 7 shows the membrane reactor in action. The membrane separates a first zone from a second zone. The first zone contains methane and steam. Upon dehydrogenation of the methane, hydrogen in the form of protons passes through the membrane to the second zone. Current is applied across the membrane to encourage transport.

EXAMPLE 1

Membrane Preparation

A tubular asymmetric membrane of 60 wt. % Ni—BaZr$_{0.7}$Ce$_{0.2}$Y$_{0.1}$O$_{3-y}$ (BZCY72) support with a 30 µm dense membrane was synthesized using a reactive sintering approach (Coors et al. Journal of Membrane Science 376 (2011) 50-55). Precursors of BaSO$_4$, ZrO$_2$, Y$_2$O$_3$ and CeO$_2$ were mixed in stoichiometric amounts (metal basis) together in a Nalgene bottle on ajar roller for 24 h. The material was dried in air and sieved through a 40 mesh screen. This forms a precursor mixture.

Two portions of the mix were mixed additionally with 64 wt. % NiO. One of those portions was then blended with water soluble acrylic and cellulosic ether plasticizer to prepare the extrusion batch.

Green tubes were extruded using a Loomis extruder. The extruded tubes were then dried and spray coated with the precursor mixture after drying. After a second drying step the tubes were dip coated in a solution of the previous second portion (containing NiO). The tubes were co-fired by hang-firing in air at 1600° C. for 4 h. This process creates an internal NiO—BZY support layer with dense membrane layer and outer NiO—BZY layer. The sintered tubes were then treated in a hydrogen mixture (safe gas) at 1000° C. to reduce the NiO to Ni and give the necessary porosity in anode support structure and outer cathode.

Dimensions of the cell tube are ~25 cm long with an outer diameter of ~10 mm, an inner diameter of ~9.8 mm and a membrane thickness of ~30 µm.

Catalyst

The anode support structure consisting of the 60 wt. % Ni-BZCY72 provides sufficient catalytic activity Reactor The reactor consists of a 1" metallic outer tube (800 HT). The ceramic tube above was mounted on a membrane tube fitting with a o-ring (Kalrez) seal and placed inside the outer tube. Inner gas tube and current collector consisted of at Ni-tube (O.D. 4.6 mm). To ensure contact with the support, Ni wool was put into the end of the tube. The temperature was monitored with 3 thermocouples, two outside the reactor at heights corresponding to the top and bottom of the electrode, and one inside ceramic tube at a height corresponding to the top of the electrode. For cathode current collector Cu wire was wrapped around the electrode. Gas analysis was performed using a micro GC (Model 490, Varian) measuring the concentrations of He, H$_2$, CH$_4$, CO and CO$_2$ in the product and sweep outlet gas lines.

EXAMPLE 2

Membrane Preparation 2 tubular membranes, A and B, of 6 cm each where prepared as described in Example 1. Both segments have outer electrode areas of 14.1 cm$^2$. Segment A is connected with segment B in series. The two segments are connected in series together using a glass ceramic based interconnect. Segment A is further sealed to an alumina riser of 25 cm length using a glass ceramic seal. Segment B is capped with a glass ceramic seal.

Catalyst

The anode support structure consisting of the 60 wt. % Ni-BZCY72 provides sufficient catalytic activity Reactor and Setup The reactor consists of a 1" metallic outer tube (800 HT). The segmented ceramic tube on riser was mounted with Swagelok fittings seal and placed inside the outer tube. Inner gas tube and current collector consisted of at Ni-tube (O.D. 4.6 mm). To ensure contact with the support, Ni wool was put into segment A. The temperature was monitored with 3 thermocouples, two outside the reactor at heights corresponding to the top and bottom of the electrode, and one inside ceramic tube at a height corresponding to the top of the electrode. For cathode current collector Cu wire was wrapped around the cathodes. Current wires where taken from cathode of segment B. Gas analysis was performed using a micro GC (Model 490, Varian) measuring the concentrations of He, H$_2$, CH$_4$, CO and CO$_2$ in the product and sweep outlet gas lines. A Hameg 4040 power source with 4 terminals was used in galvanostatic mode for the hydrogen removal, compression and production of heat.

Process

The reactor was operated at 800° C. using the reactor and membrane electrode assembly as described above. A gas mixture consisting of 28% CH$_4$, 17% H$_2$ and 55% H$_2$O was fed to the first zone where a reforming reaction occurs to convert methane and steam to hydrogen to thermodynamic equilibrium. An external electric field of 5 A was applied to the membrane. A back pressure regulator at the outlet of second zone was adjusted so that the pressure increased in a step-wise manner. The continuous transport of hydrogen through the membrane allows for a continuous increase in pressure as shown in FIG. 1. A total pressure difference of 11 bar was obtained.

A membrane electrode assembly of 18.9 cm$^2$ with a area specific resistance (ASR) of 0.8 Ω cm$^2$ operating at a current density of 328 mA/cm$^2$ will emit 2.7 W. A bundle of 215 tubes will generate 14 kWh during 24 h operation. This heat will balance the heat required to steam reform 6 Nm$^3$ of CH$_4$ at a conversion of 98%.

The invention claimed is:

1. A process for compressing hydrogen in a membrane reactor; said membrane reactor comprising a membrane electrode assembly, said membrane reactor further comprising a first zone separated by a hydrogen transport membrane from a second zone, said first zone having a gas inlet and a product outlet and said second zone having a product outlet; said process comprising:

feeding a gas comprising a hydrocarbon to said first zone, and allowing a reaction to take place in said first zone so that hydrogen is formed;

applying an electric field over said hydrogen transport membrane; and allowing the hydrogen to disassociate into electrons and protons in said first zone and allowing protons to selectively pass through the hydrogen transport membrane to said second zone, where protons recombine to form of hydrogen in the second zone;

wherein the membrane reactor comprises a pressure regulator at said product outlet from said second zone so that, in operation, the partial pressure of hydrogen in the second zone is higher than the partial pressure of hydrogen in the first zone; and wherein said membrane electrode assembly comprises, in the following layer order:

a supporting electrode material comprising a Ni composite of formula Ni-AZr$_a$Ce$_b$Acc$_c$O$_{3-y}$;

the hydrogen transport membrane layer material comprising AZr$_a$Ce$_b$Acc$_c$O$_{3-y}$;

and a second electrode material comprising a Ni composite of formula Ni-AZr$_a$Ce$_b$Acc$_c$O$_{3-y}$;

wherein, for each layer independently,

A is Ba, Sr, Ca or a mixture thereof;

the sum of a, b, and c equals 1;

b is from 0 to 0.45;

c is from 0.1 to 0.5;

Acc is Y, Yb, Pr, Eu, Pr, Sc, In, or a mixture thereof; and y is a number such that formula (I) is uncharged.

2. The process as claimed in claim 1, wherein the gas added to the first zone comprises the hydrocarbon and water, the process produces reaction products at the product outlet of the first zone, and said reaction products comprise CO and/or CO$_2$.

3. The process as claimed in claim 1, wherein the membrane reactor is operated at a temperature above 400° C.

4. The process as claimed in claim 1, wherein the hydrogen extracted from the first zone shifts the reaction equilibrium towards the product side.

5. The process as claimed in claim 1, wherein heat emitted from ohmic losses in the hydrogen transport membrane is used to heat the first zone.

6. The process as claimed in claim 1, wherein the hydrogen transport membrane catalyzes a dehydrogenation reaction.

7. The process as claimed in claim 1, wherein the hydrogen in the second zone is compressed and is at a pressure of 2 bar or more.

8. The process as claimed in claim 1, wherein the gas fed to the first zone is a mixture of methane and steam in a molar ratio of from 1:2 to 1:3.

9. The process as claimed in claim 1, wherein said hydrogen transport membrane comprises at least one mixed metal oxide of formula (I)

$$BaZr_aCe_bY_cO_{3-y} \qquad (I)$$

wherein the sum of a, b, and c equals 1;

b is from 0 to 0.45;

c is from 0.1 to 0.5; and y is a number such that formula (I) is uncharged.

10. The process as claimed in claim 1, wherein 2.75≤y≤2.95.

11. The process as claimed in claim 9, wherein 2.75≤y≤2.95.

* * * * *